US012300063B2

(12) United States Patent
Wyllie

(10) Patent No.: US 12,300,063 B2
(45) Date of Patent: May 13, 2025

(54) ACTIVITY MONITORING IN AN ELECTRONIC GAMING ENVIRONMENT

(71) Applicant: Aristocrat Technologies Australia Pty Limited, North Ryde (AU)

(72) Inventor: Andrew Wyllie, North Ryde (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 258 days.

(21) Appl. No.: 17/930,499

(22) Filed: Sep. 8, 2022

(65) Prior Publication Data

US 2023/0075947 A1 Mar. 9, 2023

(30) Foreign Application Priority Data

Sep. 9, 2021 (AU) ................................ 2021229211

(51) Int. Cl.
*G07F 17/32* (2006.01)

(52) U.S. Cl.
CPC ........ *G07F 17/323* (2013.01); *G07F 17/3223* (2013.01); *G07F 17/3239* (2013.01)

(58) Field of Classification Search
CPC ....................................................... G07F 17/32
See application file for complete search history.

(56) References Cited

U.S. PATENT DOCUMENTS

| | | | | |
|---|---|---|---|---|
| 2018/0122185 | A1* | 5/2018 | Miller | H04W 4/80 |
| 2018/0293834 | A1* | 10/2018 | Cage | H04W 4/02 |
| 2021/0280016 | A1* | 9/2021 | Oberberger | G07F 17/3244 |
| 2023/0306819 | A1* | 9/2023 | Oberberger | G07F 17/3295 |

* cited by examiner

*Primary Examiner* — Omkar A Deodhar
(74) *Attorney, Agent, or Firm* — Armstrong Teasdale LLP

(57) ABSTRACT

A gaming activity monitoring system that includes a plurality of gaming devices and at least one server computer comprising one or more processors, a memory, and an interface. The memory stores instructions which when executed cause the one or more processors to receive user activity data corresponding to gaming related activity at one or more gaming venues and including identification data enabling the server to associate received user activity data with a respective user, process the received user activity data and one or more user triggers of the respective user stored in the memory in order to determine whether the received user activity data satisfies the one or more user triggers of the respective user, and trigger an action in respect of at least one gaming device of the plurality of gaming devices and/or the user's mobile device, in response to at least one of the user triggers being satisfied.

20 Claims, 4 Drawing Sheets

ACTIVITY MONITORING IN AN ELECTRONIC GAMING ENVIRONMENT

CROSS-REFERENCE TO RELATED APPLICATIONS

This application claims the benefit of priority to Australian Patent Application No. 2021229211, filed Sep. 9, 2021, all of which is incorporated herein by reference in its entirety.

FIELD

The present application relates to a method and system for activity monitoring at one or more gaming venues.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, a gaming activity monitoring system is provided. The system includes a plurality of gaming devices located at one or more gaming venues, and at least one server computer comprising one or more processors, a memory, and an interface for receiving user trigger data defining one or more trigger conditions and establishing one or more user triggers for the one or more trigger conditions in the memory based on the received user trigger data. The memory also storing instructions which when executed cause the one or more processors to: receive user activity data corresponding to gaming related activity at the one or more gaming venues and including identification data enabling the server computer to associate received user activity data with a respective user; process the received user activity data and the one or more user triggers of the respective user stored in the memory in order to determine whether the received user activity data satisfies the one or more user triggers of the respective user; and trigger an action in respect of at least one gaming device of the plurality of gaming devices and/or a mobile device of the respective user, in response to at least one of said user triggers being satisfied.

In another aspect, a computer-implemented method of monitoring gaming activity in respect of one or more gaming venues is provided. The method includes receiving, at a server computer via an interface, user trigger data defining one or more trigger conditions, establishing one or more user triggers for the one or more trigger conditions in memory of the server computer, receiving user activity data corresponding to gaming related activity at one or more gaming venues comprising a plurality of gaming devices wherein the user activity data includes identification data enabling the server computer to associate received user activity data with a respective user, processing the received user activity data and the one or more user triggers of the respective user stored in the memory in order to determine whether the received user activity data satisfies the one or more user triggers of the respective user, and triggering an action within at least one gaming device of the plurality of gaming devices and/or a mobile device of the respective user, in response to at least one of said user triggers being satisfied.

In another aspect, at least one non-transitory computer readable storage media having computer-executable instructions embodied thereon is provided. When executed by one or more processors of at least one server computing device including an interface for receiving user trigger data defining one or more trigger conditions and establishing one or more user triggers for the one or more trigger conditions based on the received user trigger data, the computer-executable instructions cause the one or more processors to: receive user activity data corresponding to gaming related activity at one or more gaming venues including a plurality of gaming devices, the user activity data including identification data enabling the server computer to associate received user activity data with a respective user; process the received user activity data and the one or more user triggers of the respective user in order to determine whether the received user activity data satisfies the one or more user triggers of the respective user; and trigger an action in respect of at least one gaming device of the plurality of gaming devices and/or a mobile device of the respective user, in response to at least one of said user triggers being satisfied.

There is disclosed a gaming activity monitoring system and method where a user can set trigger conditions for an action (e.g., a warning message) using their mobile device, whereafter the gaming activity monitoring system establishes a trigger for the user within the system, monitors activities at one or more gaming venue(s) (e.g., amount spent, time at venue, frequency of visits) and triggers the action if a user's trigger(s) are satisfied An example embodiment describes a gaming activity monitoring system that includes a plurality of gaming devices located at one or more gaming venues, and at least one server computer comprising one or more processors, a memory, and an interface for receiving user trigger data defining one or more trigger conditions and establishing one or more user triggers for the one or more trigger conditions in the memory based on the received user trigger data. The memory also stores instructions which when executed cause the one or more processors to receive user activity data corresponding to gaming related activity at the one or more gaming venues and includes identification data enabling the server to associate received user activity data with a respective user, process the received user activity data and the one or more user triggers of the respective user stored in the memory in order to determine whether the received user activity data satisfies the one or more user triggers of the respective user, and trigger an action in respect of at least one gaming device of the plurality of gaming devices and/or the user's mobile device, in response to at least one of said user triggers being satisfied.

Another example embodiment describes a method of monitoring gaming activity in respect of one or more gaming venues. The method includes receiving, at a server computer via an interface, user trigger data defining one or more trigger conditions, establishing one or more user triggers for the one or more trigger conditions in memory of the server computer, receiving user activity data corresponding to gaming related activity at one or more gaming venues comprising a plurality of gaming devices wherein the user activity data includes identification data enabling the server to associate received user activity data with a respective user, processing the received user activity data and the one or more user triggers of the respective user stored in the memory in order to determine whether the received user activity data satisfies the one or more user triggers of the respective user, and triggering an action in respect of at least one gaming device of the plurality of gaming devices and/or the user's mobile device, in response to at least one of said user triggers being satisfied.

DETAILED DESCRIPTION

In an electronic gaming environment, many technical challenges exist when attempting to track the activities of a player. For example, if a player utilizes multiple different gaming devices within a particular venue, the individual gaming devices may not be capable of tracking and relating all of the player's activities. Some of the activities may be lost or may not be able to be connected together and related to that particular player. Accordingly, in such systems, it is not possible for actions, such as sending messages to the player, to be triggered based on player activity at each of the gaming devices in the venue that were used by the player.

Accordingly, the systems and methods provided herein include technical solutions and improvements over known systems regarding at least: a) improved tracking user activity within a venue by using a server computer device configured to communicate with and receive activity data a mobile device of the user via, for example, one or more Bluetooth beacons; and b) triggering actions based on received user trigger data that defines one or more trigger conditions and establishes one or more user triggers for the one or more trigger conditions in a memory based on the received user trigger data.

Figure 1:
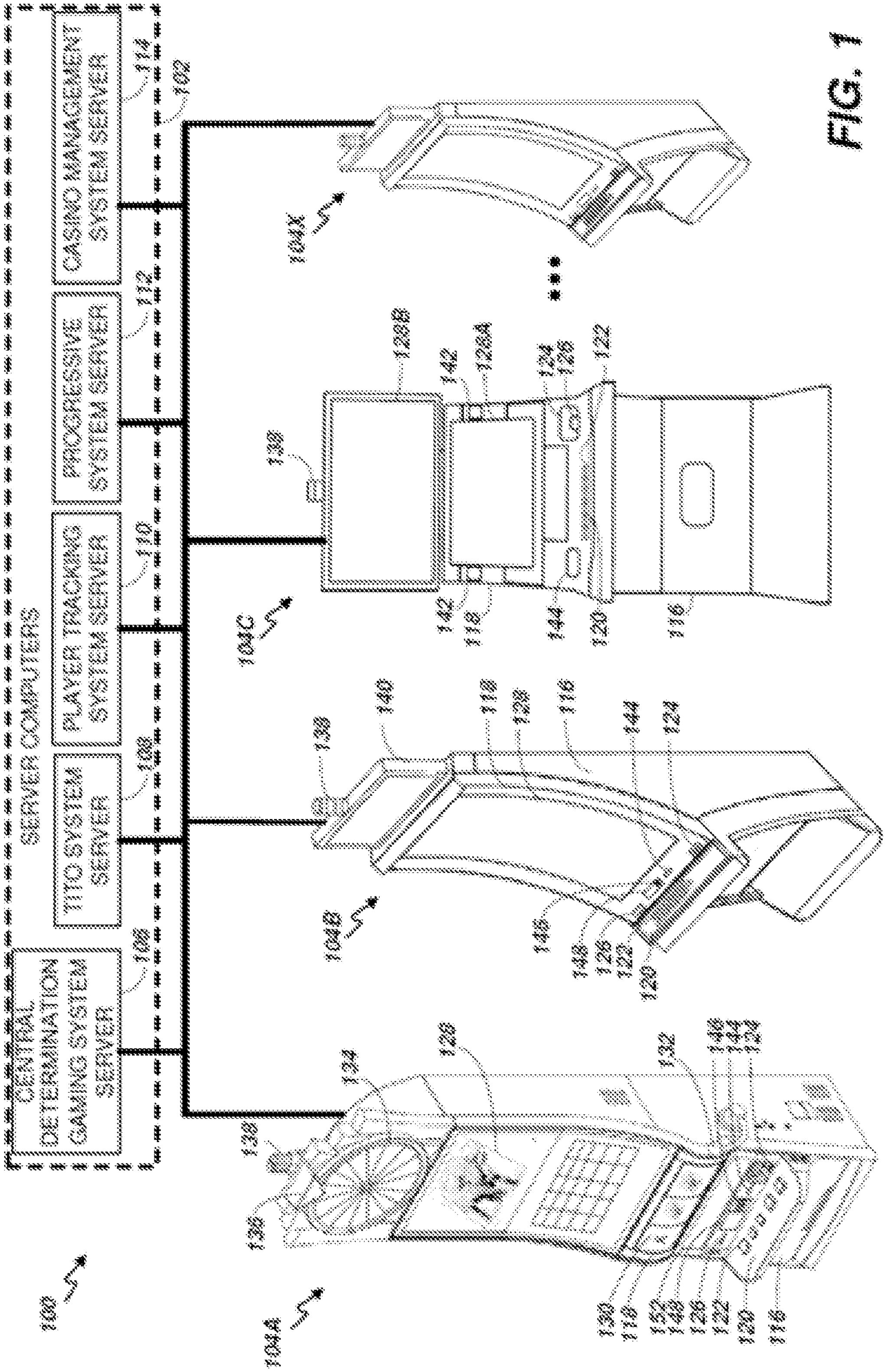
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
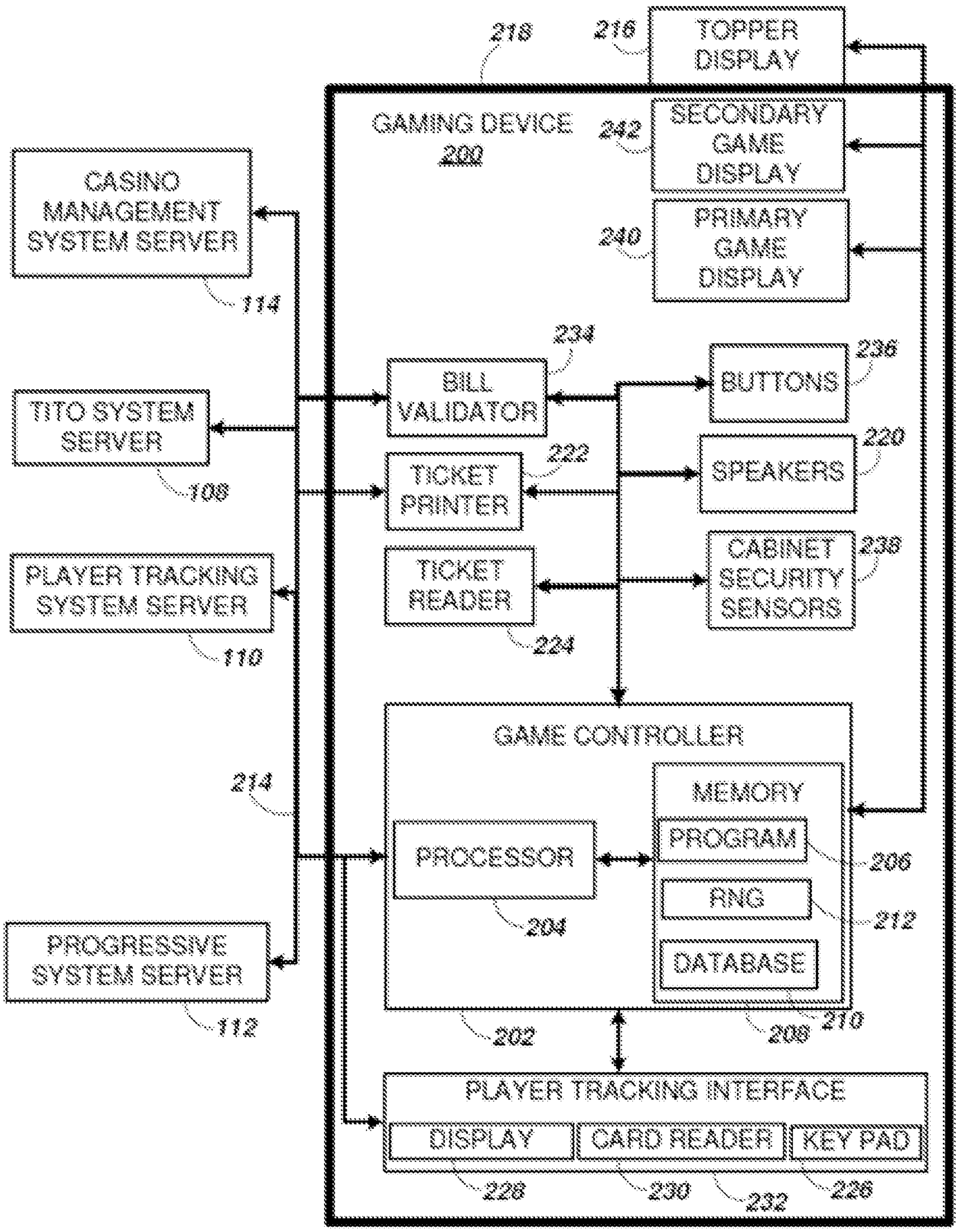
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a credit input mechanism such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The credit balance may be stored in a meter in memory 208 (or in a separate hardware meter). In some embodiment, memory 208 implements a credit meter to monitor to the credit balance and has a win meter that monitors any amounts won during any game instance(s) resulting from the wager. The balance of the win meter is transferred to the credit meter prior at the conclusion of the game instances. The player may also optionally insert a loyalty club card into the card reader 230. In some embodiments, the loyalty club card may also act as a credit input mechanism, by allowing a player to transfer funds from a centrally stored balance in order to establish a credit balance. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
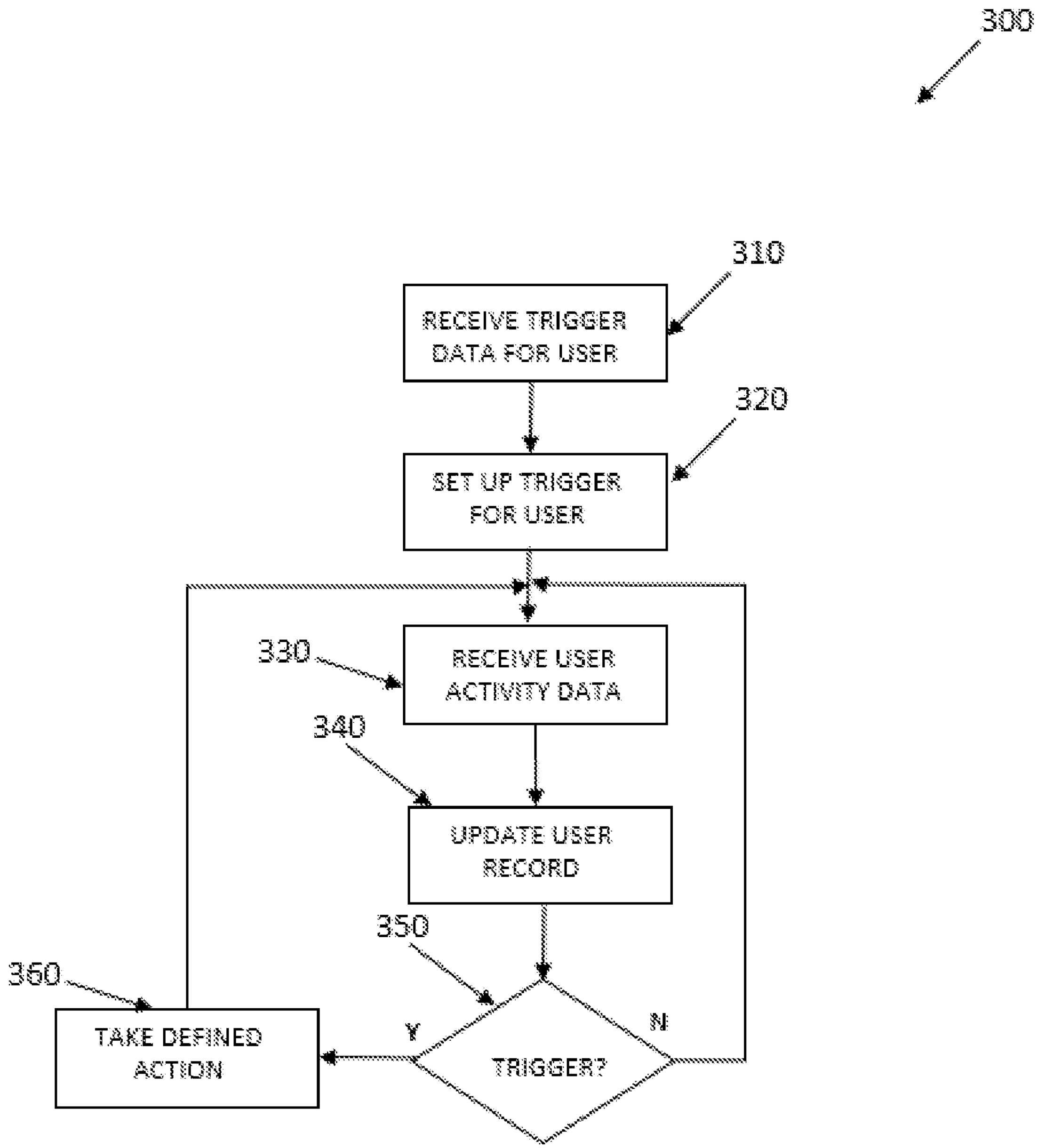
FIG. 3 is a flow chart of a method of operating an activity monitoring system.
Figure 4:
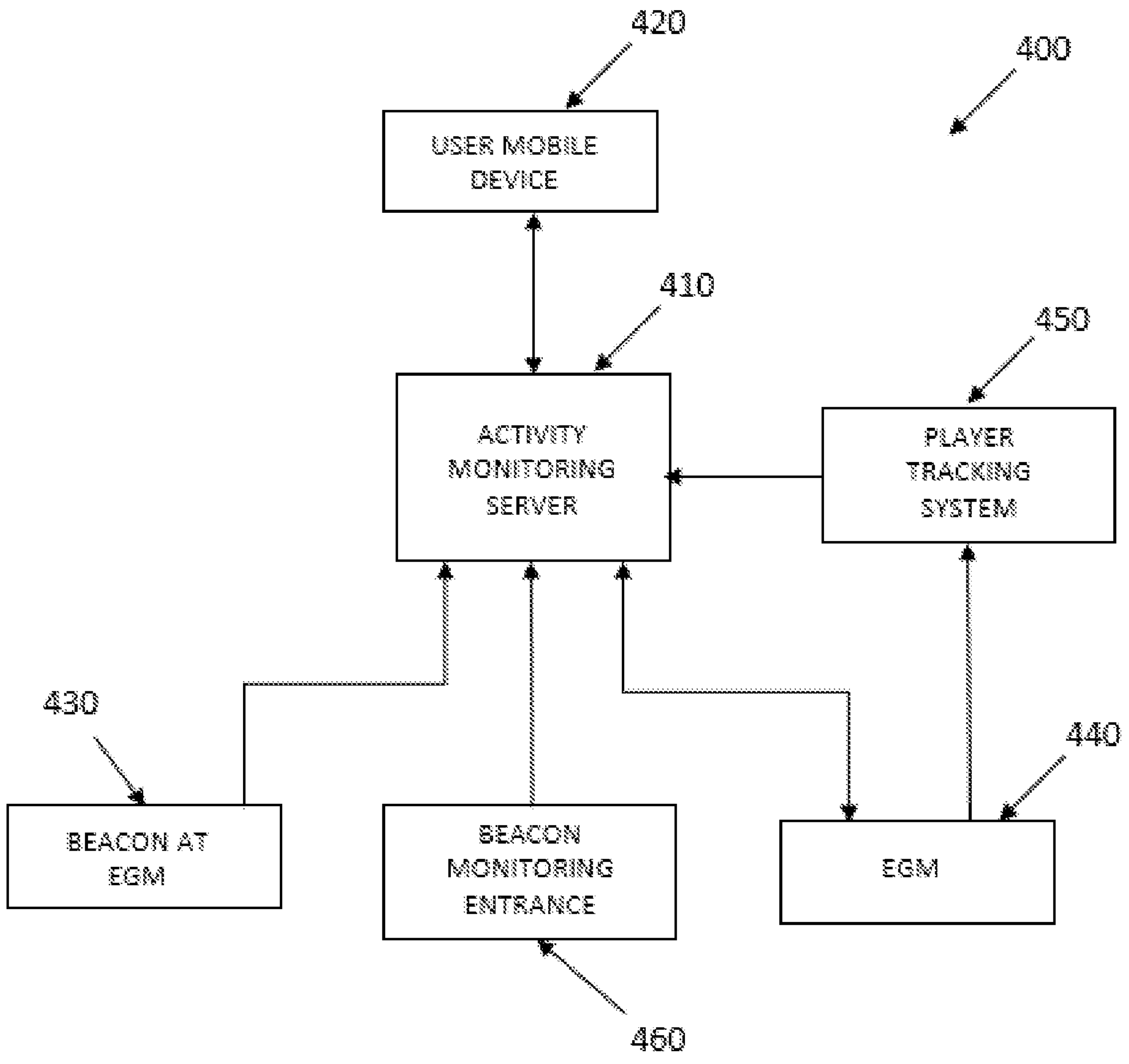
FIG. 4 is a block diagram of an activity monitoring system.

FIG. 3 is a flow chart 300 of an embodiment of an activity monitoring method and FIG. 4 is a block diagram 400 illustrating example components that may communicate with an activity monitoring server 410. In some examples activity monitoring server 410 may be implemented within a player tracking system 110, 450, however, FIG. 4 illustrates an example of activity monitoring server 410 being implemented as a separate server to player tracking system 450. In some examples, monitoring server 410 may be provided by more than one server computer arranged for load balancing, redundancy, etc. The block diagram 400 of FIG. 4 illustrates an embodiment where the activity monitoring server is provided at a single venue, however in other embodiments the monitoring server monitors a plurality of venues, for example, venues owned by the same operator or that have agreed to share data. Activity monitoring server 410 comprises one or more processors and memory.

At step 310, an activity monitoring server 410 receives trigger data from a user mobile device 420 via an interface configured to receive communications from the user mobile device. In an example, user mobile device 420 is a Bluetooth enable smartphone. Other mobile terminals may be used, for example, tablets (such as an iPad) with cellular and Bluetooth communication capability or smart watches with cellular and Bluetooth communication capability. Further some venue configurations may permit the mobile terminal to communicate via a wi-fi network in which case cellular communication capability is unnecessary. In some configurations, communications may occur solely via a venue's wi-fi network to assist in identifying that a user's is in the venue.

In FIG. 4, an activity monitoring application is downloaded to the user's mobile device. A user interacts with the application to complete registration, for example to establish an account and register their membership of the player tracking system 110, for example, by entering an existing player tracking identifier, scanning a player loyalty card, or establishing a new account within the player tracking system.

Activity monitoring application presents a user interface that enables a user to configure trigger conditions by specifying parameters to be monitored, values for those parameters and actions. User interface also enables the user to combine triggers. In example embodiments, the interface is arranged so that a user can use Boolean AND statements or Boolean OR statements but not a mixture of AND/OR statements in order to provide simplicity of implementation and to allow for a wide audience who may not be familiar with Boolean logic and hence may misconfigure their desired trigger. However, in other embodiments, the user interface may allow the user to combine trigger parameters using more complex logic.

For example, User A sets Trigger 1 AND Trigger 2 AND Trigger 3 to send Message X requiring all three trigger conditions to be met before Message X is sent to User A.

In another example User B sets Trigger 1 OR Trigger 2 OR Trigger 3 to send Message X requiring one or more of the three trigger conditions to be met before Message X is sent to User B.

In another example, User C sets Trigger 1 to send Message X, Trigger 2 to send Message Y, and Trigger 3 to send Message Z. This configuration allows for separate messages with no dependencies.

In this example, the defined action configurable by the user is to send or display a message on the user's mobile device (which may also be accompanied by a vibration or sound), however, other actions can be taken, for example, to implement a cool down period on an EGM where the EGM is prevented from initiating a new play of a game.

Advantageously, the user interface of the activity monitoring application running on the user's device enables the user to set their own limits on their personal device rather than requiring the user to configure the limits with venue staff which is a potential barrier to uptake.

In such embodiments, when the user starts a session at an EGM there is no indication outside of the user's mobile device that the user has limits set.

In an example, when a trigger condition is met, the messages are configured so that a generic push notification is initially displayed on the user's personal device to inform them they "Have A New Message". The actual message associated with the trigger is then displayed in the application when the user brings it to the forefront and/or opens it.

As indicated above, in some examples, the user may incorporate an action that disables the EGM. In some examples, the user may also set an action to notify venue staff for intervention. In this example, the user's EGM will disable and appropriately trained venue staff are notified to perform the intervention. In this embodiment, this is the only time that any venue staff will have knowledge of any user's settings.

All data reporting by the system other than exceptions to allow for venue interventions, where the intervention has not been recorded as complete, is anonymous for analysis only. Venue staff have no facility to access a user trigger settings or activation status.

In other examples, the system may also incorporate a facility for venue staff to set a trigger on behalf of a user, for example using a web-based user interface or to configure standard triggers that a user can elect to select via their user device.

In some examples, messages may be set to repeat while the conditions are still active. For example, every 15 minutes. In an example, this repeat messaging function is activated when a trigger is satisfied and involves the activity monitoring server 410 setting up a timer at the end of the time retesting whether the trigger is still valid prior to the repeat message being sent. For example, if the trigger relates to the user being present at the venue and the user has left, the reminder message is not sent.

The parameters employed for trigger conditions depend on the embodiment. A number of example parameters and the activity data that is reported to the activity monitoring server to enable monitoring of the trigger conditions are discussed below.

Session Length

In an example, a session is the duration in hours and minutes from first identification of a user being at an EGM (gaming device) to identification of the user having left the gaming device. In other examples, a session may continue when the user moves to another gaming device within a configured time period. In another example, a separate parameter can be set for total gaming time at a venue. Commencement of a session can be detected in a number of different ways.

In example, where a player has a player tracking card and inserts the player tracking card at an EGM 440 (either directly into the EGM or into a player marketing module or the like), this can be reported directly to the activity monitoring server 410 or reported to a player tracking system 450 which reports it to the activity monitoring server 410. In this example, the session is ended when a player removes their playing tracking card.

In another example, a Bluetooth™ beacon 430 may be incorporated into the EGM or co-located with the EGM and used to detect whether the user's mobile device has been brought into proximity with a gaming device and a session initiated on this basis. Example techniques for starting or ending a gaming session using Bluetooth beacons are described in Australian Patent Application 2019280011 entitled "A GAMING SYSTEM WITH PROXIMITY BASED FUNDS TRANSFER" which is incorporated herein by reference. This application also describes an architecture for presenting a loyalty application into which the monitoring application can be incorporated.

In another example, a user may start and/or end gaming sessions manually using the activity monitoring application on their mobile device 420.

The value for a session can be set as a time in hours and/or minutes. In some examples a set of session lengths can be selected from.

Frequency of Play

In an example, frequency of play is defined as a number of times a user visits a venue within a time period. In an example, the time period is a value of the parameter configurable by a user. In an example, a default rolling period of one week is the time period but this value can be configured by the user.

In an example, a new visit is triggered if a user is detected at the venue again after a defined cooldown period (e.g. four hours) or a period where they have been inactive (e.g. one hour) in combination with defined exit event—e.g. exiting a gaming room or a gaming venue as detected by a Bluetooth beacon 460 monitoring and entrance/exit. Australian Patent Application 2019232826 in respect of "A GAMING SYSTEM WITH GEOFENCED FUNDS TRANSFER" which is incorporated herein by reference describes example techniques for detecting the location of a user within a venue that can be employed in the current embodiments.

Amount Spent

In an example, amount spent tracks the difference between how much a user spends and how much they collect. In an example, Amount Spent=Amount Inserted−Turnover+Credits Won+Jackpot Hand Pays. In an example, values of the Amount Spent parameter are configured in dollars and cents. Amount Spent can be tracked over a selectable rolling period, for example based on gaming session, day, week, month/4 weeks, year. In the alternative or in addition, a user may select a non-rolling period such as a month. Depending on implementation, this trigger condition may be monitored based on communications from the EGMs 440 or the or the player tracking system 450 to the activity monitoring server 410.

Win Threshold

In an example, Win Threshold is available as a parameter for setting a trigger only as a sub-option of the Amount Spent trigger condition. In an example, Win Threshold may be configured as a multiplier of Amount Spent. In another example, Win Threshold may configured as a dollar value. In this example, Win Threshold can be configured independently of Amount Spent too. Depending on implementation, this trigger condition may be monitored based on communications from the EGMs 440 or the or the player tracking system 450 to the activity monitoring server 410.

Amount Wagered

In an example, amount wagered tracks the average wager of a user. In an example, the amount in dollars and cents and the time period are both configurable. For example, User A sets a limit of 50 cents on an EGM where each credit is 1 cent with a time value of 5 minutes. In this example, the trigger condition will be met if User A bets more than 50 cents for a duration exceeding 5 minutes. Depending on implementation, this trigger condition may be monitored based on communications from the EGMs 440 or the player tracking system 450 to the activity monitoring server 410.

Turnover (Total Bets)

In an example, Turnover tracks the amount of money the user wagers over a period of time. Unlike Amount Spent, Turnover does not track any wins. In an example, values of the Turnover parameter are configured in dollars and cents. Turnover can be tracked over a selectable rolling period, for example based on gaming session, day, week, month/4 weeks, year. In the alternative or in addition, a user may select a non-rolling period such as a month. Depending on implementation, this trigger condition may be monitored based on communications from the EGMs 440 or the player tracking system 450 to the activity monitoring server 410.

Accordingly, once trigger data is received for the user, the activity monitoring server sets up the trigger for the user in memory at step 320. In an example, this involves the processor of the activity monitoring server 410 setting up an entry in a database with an identifier of the user (e.g. received from the monitoring application) and the trigger condition(s) specified by the user to thereby establish a trigger. In some examples, this may include setting a start time for monitoring of a time related values.

At step 330, the activity monitoring server 410 receives user activity data 330, uses a user identifier to identify a trigger, and updates any values related to the trigger. At step 340, the activity monitoring server 410 processes the received activity data in order to be able to determine at step 350 whether a trigger is met. In some examples, processing the received activity data may comprise initiating a process executing on the server for monitoring the trigger. For example, where the trigger relates to a session duration and the activity data indicates the start of a session based on detection of the user at an EGM, activity monitoring server 410 starts a session timer in order to monitor the length of the session. That is, in this example, processing of the activity data is to set in place a process that will cause the trigger to be met after expiry of a time period. In some examples where an established trigger has multiple conditions and one of the conditions is time related, activity monitoring server 410 may establish a process for checking for updated received activity data.

If all the trigger conditions for a given trigger are not met at step 350, the activity monitoring server 410 reverts to step 330.

If all the trigger conditions are met at step 350, activity monitoring server 410 takes the defined action.

In some examples, the user can choses to receive default messages. In some examples, the user can select a message from a drop-down menu when setting up the trigger. In some examples the user can create their own messages. The configured messages are received by the activity monitoring server 410 as action data defining the action to be triggered in response to the trigger being met.

Example messages include:

Generic: "The {session time/wager amount/etc) you set has been reached."

Session: "Hey, just letting you know you've been playing for x/for longer than x".

Frequency of Play: Hey, just letting you know you've visited x times/more than x times"/

Amount Spent: "Hey, just letting you know you've spent x".

Win Threshold: "Hey, just letting you know you've won x".

Amount Bet: "Hey, just letting you know your betting x".

Total Bets: "Hey, just letting you know your total bets have reached x".

It will be apparent that any other examples other messages can be employed.

As indicated above, in some examples, activity monitoring server 410 is configured to send repeat messages when a trigger condition is still met after a defined time period. Accordingly, in such examples activity monitoring server 410 sets up a process for monitoring whether the message repeat condition as part of taking the action at step 360.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming activity monitoring system comprising:

a plurality of gaming devices located at one or more gaming venues; and at least one server computer comprising one or more processors, a memory, and an interface for receiving user trigger data defining one or more trigger conditions and establishing one or more user triggers for the one or more trigger conditions in the memory based on the received user trigger data, the memory also storing instructions which when executed cause the one or more processors to:

receive user activity data corresponding to gaming related activity at multiple gaming devices of the plurality of gaming devices of the one or more gaming venues and including identification data enabling the server computer to associate received user activity data with a respective user;

process the user activity data received from the multiple gaming devices and the one or more user triggers of the respective user stored in the memory in order to determine whether the received user activity data satisfies the one or more user triggers of the respective user; and trigger an action in respect of at least one gaming device of the plurality of gaming devices and/or a mobile device of the respective user, in response to at least one of said user triggers being satisfied.

2. The system as claimed in claim 1 further comprising one or more Bluetooth beacons configured to communicate with user mobile devices and to communicate activity data to the at least one server computer based on communication with the mobile device of the respective user.

3. The system as claimed in claim 2, wherein at least one Bluetooth beacon is co-located with a gaming device.

4. The system as claimed in claim 2, wherein at least one Bluetooth beacon is positioned to detect entry and/or exit from at least one of a gaming area of the venue and/or the venue.

5. The system as claimed in claim 1, wherein the action is to present a message to the respective user via a gaming device the respective user is playing.

6. The system as claimed in claim 1, wherein the action is to present a message to the respective user via the mobile device of the respective user.

7. The system as claimed in claim 1, wherein the interface is configured to enable receipt of a plurality of independent trigger conditions.

8. The system as claimed in claim 1, wherein the interface is configured to enable receipt of a plurality of logically combined trigger conditions.

9. The system as claimed in claim 1, wherein the interface is further configured to receive user action data defining the action to be triggered in response to a user trigger.

10. The system as claimed in claim 9, wherein the user action data comprises a message.

11. The system as claimed in claim 1, wherein receiving user trigger data comprises receiving trigger data from a user's mobile device.

12. A method of monitoring gaming activity in respect of one or more gaming venues, the method comprising:

receiving, at a server computer via an interface, user trigger data defining one or more trigger conditions;

establishing one or more user triggers for the one or more trigger conditions in memory of the server computer;

receiving user activity data corresponding to gaming related activity at multiple gaming devices of one or more gaming venues comprising a plurality of gaming devices, the user activity data including identification data enabling the server computer to associate received user activity data with a respective user;

processing the user activity data received from the multiple gaming devices and the one or more user triggers of the respective user stored in the memory in order to determine whether the received user activity data satisfies the one or more user triggers of the respective user; and triggering an action within at least one gaming device of the plurality of gaming devices and/or a mobile device of the respective user, in response to at least one of said user triggers being satisfied.

13. The method as claimed in claim 12 further comprising communicating, using one or more Bluetooth beacons, activity data to the server computer based on communication with the mobile device of the respective user.

14. The method as claimed in claim 13, wherein at least one Bluetooth beacon is co-located with a gaming device.

15. The method as claimed in claim 13 further comprising detecting, by at least one Bluetooth beacon, entry and/or exit from at least one of a gaming area of the venue and/or the venue.

16. The method as claimed in claim 12 further comprising presenting a message to the respective user via a gaming device the respective user is playing.

17. The method as claimed in claim 12 further comprising presenting a message to the respective user via the mobile device of the respective user.

18. The method as claimed in claim 12 further comprising receiving, by the interface, a plurality of independent trigger conditions.

19. The method as claimed in claim 12 further comprising receiving, by the interface, of a plurality of logically combined trigger conditions.

20. At least one non-transitory computer readable storage media having computer-executable instructions embodied thereon, wherein when executed by one or more processors of at least one server computing device including an interface for receiving user trigger data defining one or more trigger conditions and establishing one or more user triggers for the one or more trigger conditions based on the received user trigger data, the computer-executable instructions cause the one or more processors to:

receive user activity data corresponding to gaming related activity at multiple gaming devices of one or more gaming venues including a plurality of gaming devices, the user activity data including identification data enabling the server computer to associate received user activity data with a respective user;

process the user activity data received from the multiple gaming devices and the one or more user triggers of the respective user in order to determine whether the received user activity data satisfies the one or more user triggers of the respective user; and trigger an action in respect of at least one gaming device of the plurality of gaming devices and/or a mobile device of the respective user, in response to at least one of said user triggers being satisfied.

* * * * *